M. L. LITTLE.
SOLAR HEATING PLANT.
APPLICATION FILED DEC. 30, 1908.
965,391.
Patented July 26, 1910.
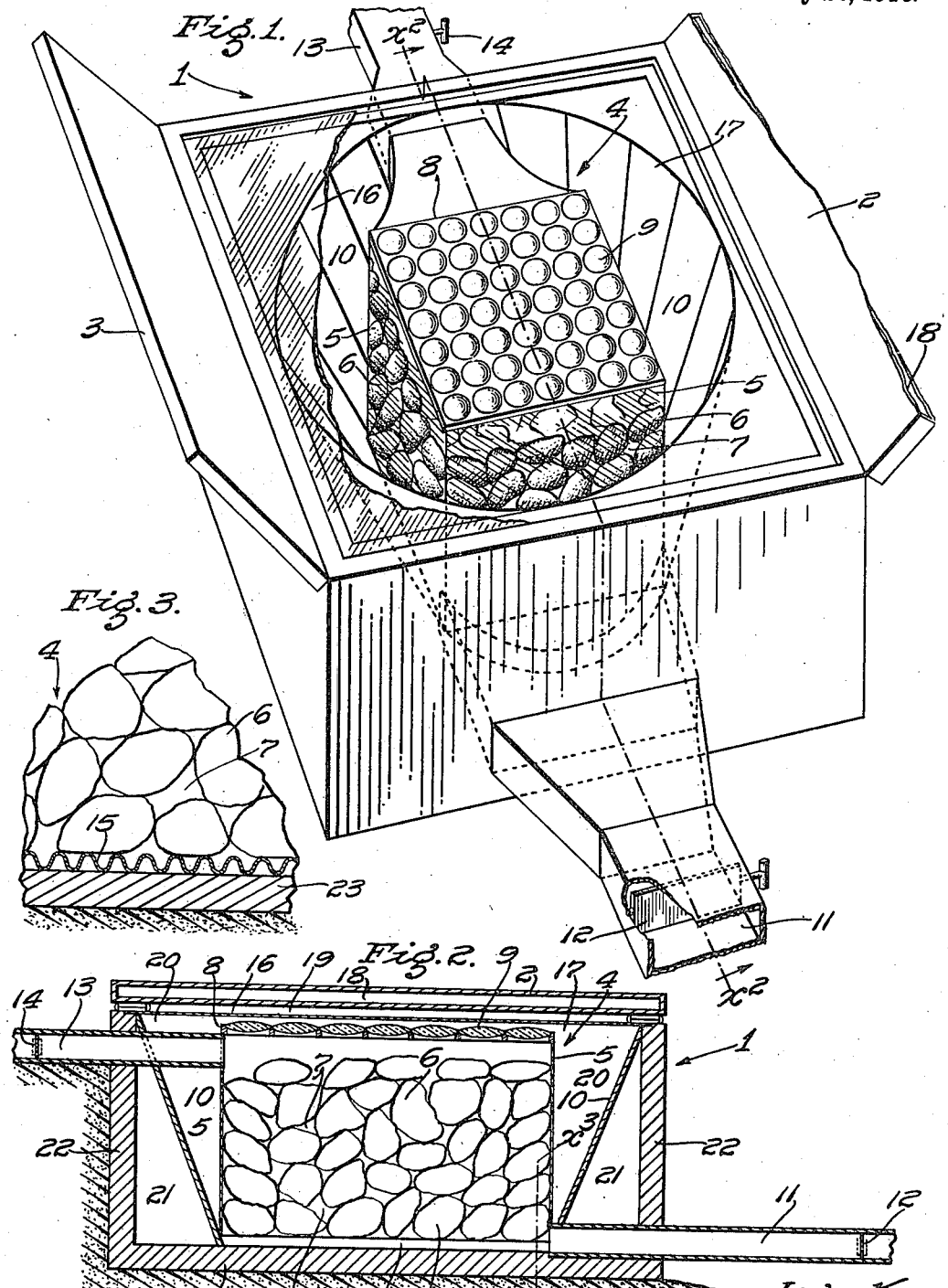
Witnesses:
W. N. Kirkby
Julia Townsend
Inventor:
Mary L. Little
by James R. Townsend
her atty.

UNITED STATES PATENT OFFICE.

MARY L. LITTLE, OF LOS ANGELES, CALIFORNIA.

SOLAR-HEATING PLANT.

965,391.  Specification of Letters Patent.  Patented July 26, 1910.

Application filed December 30, 1908. Serial No. 470,104.

*To all whom it may concern:*

Be it known that I, MARY L. LITTLE, a citizen of the United States, residing at Los Angeles, in the county of Los Angeles and State of California, have invented a new and useful Solar-Heating Plant, of which the following is a specification.

The object of this invention is to provide means for warming apartments by the heat of the sun at night and during cloudy weather, such warming to be as convenient and effective as by artificial means heretofore in use, and also being thoroughly sanitary.

The accompanying drawings illustrate the invention.

Figure 1 is a perspective view of apparatus constructed in accordance with this invention and set aslant. Fig. 2 is a longitudinal sectional elevation of an analogous apparatus set level. Line $x^2$, Fig. 1 designates the plane of section. In this view the floor of the receptacle is level. Fig. 3 is a fragmental sectional view on line $x^3$, Fig. 2.

1 represents an insulating receptacle in the form of a box, the walls of which may be of concrete or other material and of any suitable construction for retaining the heat. A cover formed of two hinged doors 2 and 3 extends over the same. 4 represents a case having translucent walls 5 through which the sun's rays may penetrate to heat loosely arranged heat-absorbing bodies 6 between which are communicating air-spaces 7. In the form shown, the case 4 is a rectangular prism, and all of the walls thereof above the base are transparent, and the top 8 is also open to the sun's rays and may be provided with lenses 9 as shown, in order to concentrate said rays upon the heat-absorbing bodies 6 inside the case.

I do not limit the construction to the use of lenses for the top, but such lenses are deemed advisable in some instances.

In case the lenses 9 are used, care is taken that the bodies 6 be so arranged as to receive the concentrated rays of the sun when the apparatus is subjected to the sun's rays.

Around the case 4 is provided a series of reflectors 10 arranged to direct to the case the sun's rays that fall upon the reflectors. The purpose is to heat the heat-absorbing bodies 6 as fully as possible during the time that the sun's rays fall upon the apparatus. The reflectors should be constructed and arranged in such manner as to receive the sun's rays from a wide area and to direct such rays to said bodies 6.

The apparatus may be arranged with a southern inclination in northern latitudes for the purpose of most advantageously receiving the rays and directing them upon the heat-absorbing bodies.

In cloudy weather at night and whenever it is deemed advisable to close the apparatus, the doors 2 and 3 will be shut down thus closing the insulating receptacle and retaining the heat within the device.

11 designates a valved air inlet and 12 a valve therefor. Said inlet opens into the bottom of the case to supply cold air thereto. 13 represents a valved air outlet leading from the top of the case to the apartments, not shown, that are to be heated. 14 designates a valve for the hot air outlet.

The heat-absorbing bodies 6 may be stones of such form that when the stones are placed together, open air-spaces or interstices will occur between them as indicated at 7. The stones may be boulders and should be thoroughly washed and dried before they are placed in the case.

15 designates a corrugated iron support for said stones, the purpose being to allow air to flow freely underneath the stones from the cold-air inlet 11 when the valves 12 and 14 are open.

A transparent glass top or inner cover 16 may be provided over the orifice of the cavity 17 around the case 4 so as to prevent the heat from being carried away by air-currents.

The cover may be provided with a dead air space 18, and a dead air space 19 may be provided between the cover and the glass top or inner cover 16. Another dead air space 20 may be provided between the case 4 and the glass top 16 and reflectors 10. Another dead air space 21 may be provided between the reflectors and the walls 22 and floor 23 of the insulating receptacle 1.

In practical use, when the sun is shining, the doors 2 and 3 may be opened so that the sun will heat the contents of the case. When the heat of the sun is no longer effective upon the apparatus the doors will be closed, thus to insulate the interior of the apparatus and retain the heat until it is desired to be used in the building, not shown, with which the hot-air outlet 13 is connected.

When it is desired to heat such building the valves 12 and 14 will be opened, thus to allow the air to pass into the case 4 and thence up through the outlet 13 to the building.

By constructing large plants of this character and arranging to concentrate a large amount of sun's rays upon the heat-absorbing bodies, the same may be brought to a high heat and such heat may be largely retained until the time of use, and great economy of fuel result.

I claim:—

A solar heater comprising an outer insulating receptacle, an inner incased airtight receptacle having transparent sides and a top composed of one or more condensing lenses and containing a plurality of loosely-packed heat-absorbing bodies with air spaces between them; said inner receptacle being seated in the heat-insulated outer inclosing casing having reflecting sides; said inner receptacle having a channeled base constituting a support for the heat-absorbing bodies and toward which said reflecting sides are downwardly and inwardly inclined, said outer casing being provided with a hinged lid to allow exposure to the sun's rays, and with a hot-air passage leading from the top and a cold-air passage leading into the bottom of the inner receptacle.

In testimony whereof, I have hereunto set my hand at Los Angeles, California, this 16th day of December, 1908.

MARY L. LITTLE.

In presence of—
  JAMES R. TOWNSEND,
  M. BEULAH TOWNSEND.